(12) United States Patent
Umeda et al.

(10) Patent No.: US 7,972,743 B2
(45) Date of Patent: Jul. 5, 2011

(54) MEMBRANE ELECTRODE ASSEMBLY, METHOD FOR PRODUCING THE SAME, AND SOLID STATE POLYMER FUEL CELL

(75) Inventors: Minoru Umeda, Nagaoka (JP); Akifumi Yamada, Nagaoka (JP); Isamu Uchida, Sendai (JP)

(73) Assignee: Nagaoka University of Technology, Nagaoka-Shi (JP)

( * ) Notice: Subject to any disclaimer, the term of this patent is extended or adjusted under 35 U.S.C. 154(b) by 1275 days.

(21) Appl. No.: 10/572,462

(22) PCT Filed: Feb. 25, 2005

(86) PCT No.: PCT/JP2005/003168
§ 371 (c)(1),
(2), (4) Date: Mar. 20, 2006

(87) PCT Pub. No.: WO2005/088749
PCT Pub. Date: Sep. 22, 2005

(65) Prior Publication Data
US 2007/0003817 A1  Jan. 4, 2007

(30) Foreign Application Priority Data

Mar. 12, 2004  (JP) ................................ 2004-070247
Jul. 23, 2004  (JP) ................................ 2004-216429

(51) Int. Cl.
*H01M 4/86* (2006.01)
(52) U.S. Cl. ........ 429/479; 429/483; 429/491; 427/115; 427/427.7
(58) Field of Classification Search ............... 429/40, 429/479, 483, 491; 427/115, 427.7
See application file for complete search history.

(56) References Cited

U.S. PATENT DOCUMENTS

2004/0241613 A1 * 12/2004  Jansen et al. ............... 433/201.1

FOREIGN PATENT DOCUMENTS

| EP | 0948071 | 10/1999 |
|---|---|---|
| JP | 2000-3714 | 1/2000 |
| JP | 2003-59507 | 2/2003 |
| JP | 2003-211063 | 7/2003 |
| JP | 2003-234015 | 8/2003 |
| WO | WO 94/25993 | 11/1994 |
| WO | WO 96/11507 | 4/1996 |

OTHER PUBLICATIONS

Shunsuke Kawaguchi, Minoru Umeda, Kazunori, Hodouchi, Akifumi Yamada, Isamu Uchida, 'Denkai Haiko Kobunshi Proton Dendomaku iii, Taisuru Denkyoku Shokubo no Funmu Toko', The Electrochemical Society of Japan Dai, 71 Kai Taikai Koen Yoshishu, Mar. 24, 2004, p. 378.

* cited by examiner

*Primary Examiner* — Jane Rhee
(74) *Attorney, Agent, or Firm* — Young & Thompson (57) ABSTRACT

A membrane-electrode assembly (MEA) 1 has a solid polymer electrolyte membrane 2. The membrane 2 has ion-conductive domains 3 and non-ion-conductive domains 4 and an electrode catalyst 5. The electrode catalyst 5 is present selectively on surface sites of the solid polymer electrolyte membrane 2 which corresponds to the ion-conductive domains 3 rather than surface sites of the membrane 2 which corresponds to the non-ion-conductive domains 4. A spray liquid containing the electrode catalyst and a solvent is applied onto a surface of the membrane 2 by electrostatic spray deposition to selectively adhere the electrode catalyst 5 on the surface sites of the membrane 2 which corresponds to the ion-conductive domains 3. The membrane 2 is preferably subjected to a hydrophilization treatment before being sprayed with the spray liquid.

17 Claims, 5 Drawing Sheets

Example 4  Comparative Example 2

MEMBRANE ELECTRODE ASSEMBLY, METHOD FOR PRODUCING THE SAME, AND SOLID STATE POLYMER FUEL CELL

TECHNICAL FIELD

This invention relates to a membrane-electrode assembly having an electrode catalyst adhered to selected sites of the surface of a solid polymer electrolyte membrane and a process of producing the same. The present invention also relates to a solid polymer electrolyte fuel cell having the membrane-electrode assembly.

BACKGROUND ART

Solid polymer fuel cells have recently been researched and developed extensively. As part of the research and development, solid polymer electrolytes having high proton conductivity have been studied from the aspects of conductivity, chemical and thermal stability, and economical efficiency. The origin of solid polymer fuel cells can be traced to the Gemini 5's on-board polymer fuel cells, which were supplanted by alkali fuel cells on account of the low performance of the solid polymer electrolyte used therein. Then, Du Pont Company developed Nafion (a registered trademark for a perfluoroalkylsulfonic acid polymer). The high proton conductivity and chemical and thermal stability possessed by Nafion have again boosted development of solid polymer fuel cells. The inventors of the present invention previously proposed a solid polymer ion conductor in which polymer molecules having an ionically dissociable group are oriented in an electric field in an attempt to provide a solid polymer electrolyte with high proton conductivity and thermal and chemical stability (see Patent Document 1).

Figure 10:
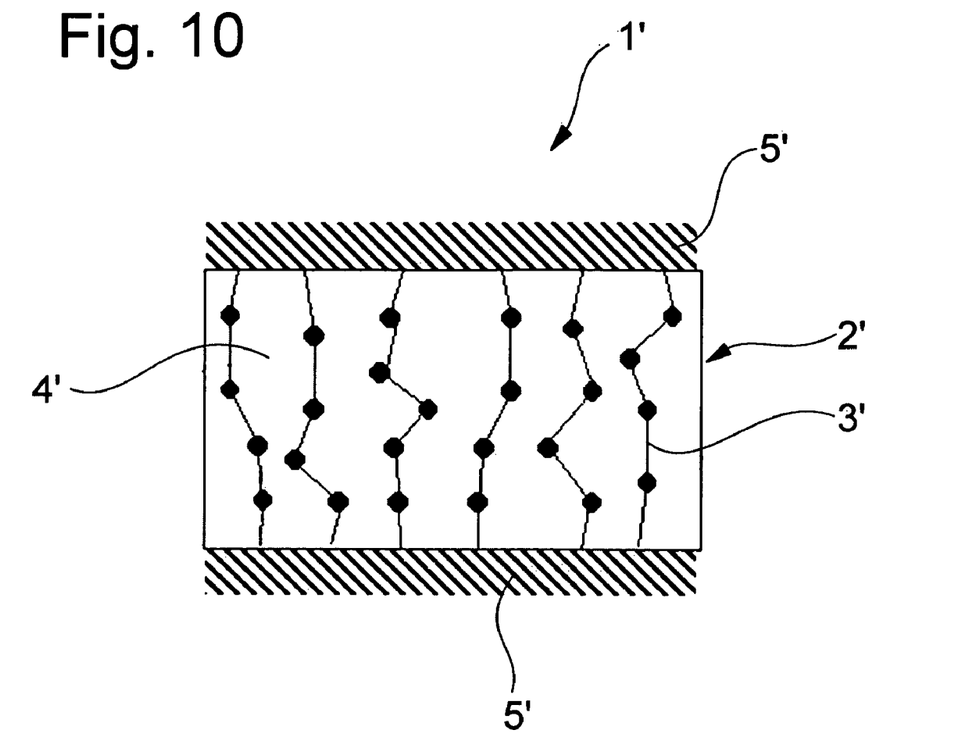
FIG. 10 schematically illustrates a conventional membrane-electrode assembly.

Central to the solid polymer fuel cell technology is a thin film device, which is a laminate of a solid polymer electrolyte membrane and electrodes, called a membrane-electrode assembly (hereinafter abbreviated as MEA). An MEA has contributed to size and weight reduction of fuel cells and driven practical application of fuel cells for vehicles and domestic use. As illustrated in FIG. 10, in a currently available MEA 1', a solid polymer electrolyte membrane 2' generally has a phase-separated structure composed of hydrophilic (ion-conductive) domains 3' and hydrophobic (non-ion-conductive) domains 4'. An electrode catalyst 5', which is adhered to the solid polymer electrolyte membrane 2', is applied to the entire surface of the solid polymer electrolyte membrane 2'. Not all the electrode catalyst 5' participates in electrode reaction, nevertheless. Only the part of the electrode catalyst that is in contact with the hydrophilic domains 3' serving for ionic conduction can participate in electrode reaction. The part of the electrode catalyst applied to the hydrophobic domains 4' is not given opportunities to take part in the reaction. In other words, the state-of-the-art MEAs have a large quantity of an electrode catalyst that does not participate in electrode reaction.

Patent Document 1: JP-A-2003-234015

Accordingly, an object of the present invention is to provide an MEA free from the above-mentioned problem associated with the related art and a process of producing the MEA.

DISCLOSURE OF THE INVENTION

The present invention accomplishes the above object by providing an MEA which has a solid polymer electrolyte membrane. The membrane has ion-conductive domains and non-ion-conductive domains and an electrode catalyst. The electrode catalyst is present selectively on surface sites of the solid polymer electrolyte membrane which corresponds to the ion-conductive domains rather than surface sites of the electrolyte membrane which corresponds to the non-ion-conductive domains.

The invention also provides a preferred process for producing the MEA. The process comprises applying a spray liquid containing the electrode catalyst and a solvent onto a surface of the solid polymer electrolyte membrane by electrostatic spray deposition.

The invention also provides a process for producing an MEA comprising the steps of:

discretely applying an ion-conductive liquid to a surface of a solid polymer electrolyte membrane which is substantially free from a dissociated proton, and then applying a spray liquid containing an electrode catalyst and a solvent onto the surface of the solid polymer electrolyte membrane by electrostatic spray deposition to adhere the electrode catalyst selectively to the part of the solid polymer electrolyte membrane where the ion-conductive liquid has been applied.

The invention also provides a solid polymer electrolyte fuel cell having the MEA and a separator which is disposed on each surface of the MEA.

BEST MODE FOR CARRYING OUT THE INVENTION

Figure 1:
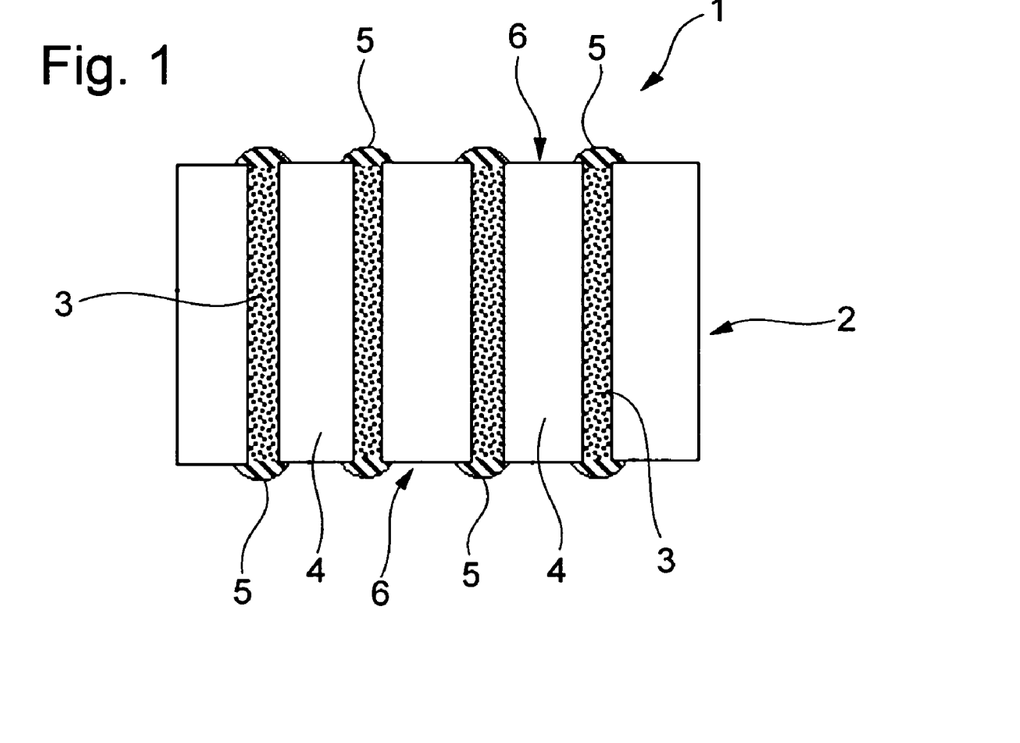
FIG. 1 is a schematic cross-section of an MEA according to the present invention.

The present invention will be described based on its preferred embodiments with reference to the accompanying drawings. In FIG. 1 is shown a schematic cross-section of an MEA according to the present invention. The MEA 1 shown in FIG. 1 has a solid polymer electrolyte membrane 2 and an electrode catalyst 5 applied to both surfaces of the membrane 2.

The electrolyte membrane 2 has ion conductivity, such as proton conductivity. The electrolyte membrane 2 has a number of ion-conductive domains 3 with ion conductivity (e.g., proton conductivity) and a number of non-ion-conductive domains 4 with no ion conductivity. The ion-conductive domains 3 and the non-ion-conductive domains 4 are phase-separated from each other. The ion-conductive domains 3 are sites that participate in electrode reaction, whereas the non-ion-conductive domains 4 are inert sites that do not substantially participate in electrode reaction. FIG. 1 schematically depicts the ion-conductive domains 3 and the non-ion-conductive domains 4 as if they extended the whole width of the electrolyte membrane 2 for the sake of facilitating understanding the invention. In an actual electrolyte membrane some ion-conductive domains can be disconnected halfway in the width direction of the membrane. The same applies to the non-ion-conductive domains.

Figure 2:
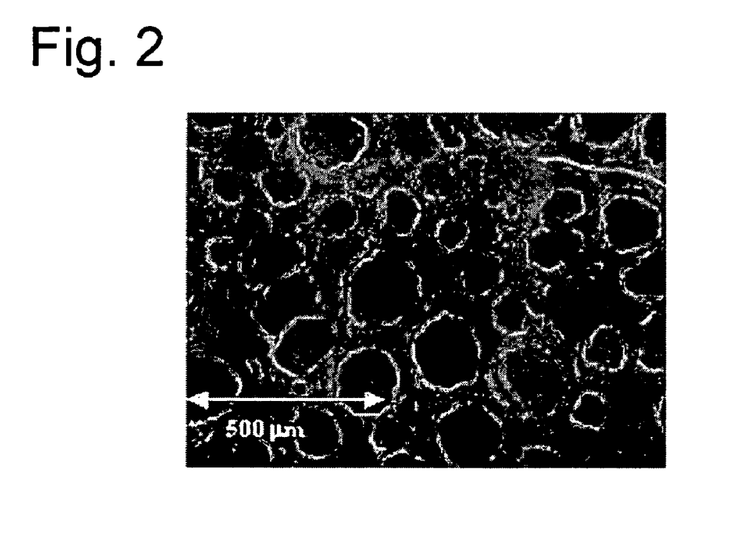
FIG. 2 is a scanning electron micrograph image taken of a surface of the electrolyte membrane used in Example 1.

FIG. 2 presents a scanning electron micrograph image taken of a surface of the electrolyte membrane used in Example 1 given later. As is apparent from FIG. 2, a number of nearly circular, shallow depressions are observed on the surface of the electrolyte membrane. These depressions correspond to the ion-conductive domains, and the portion surrounding the ion-conductive domains is the non-ion-conductive domains.

Back to FIG. 1, an electrode catalyst 5 is applied to each of surfaces 6 of the electrolyte membrane 2. What should be noted here is that the electrode catalyst 5 is applied not on the entire area of the surfaces 6 but selectively on the sites corresponding to the ion-conductive domains 3 rather than the sites corresponding to the non-ion-conductive domains 4. In the MEA 1 of the present embodiment, the electrode catalyst 5 is applied selectively on the surface sites of the ion-conductive domains 3 that participate in electrode reaction. In brief, the electrode catalyst 5 is applied selectively to where it is essentially needed. As a result, the amount of the catalyst to be used can be reduced without affecting the performance of the MEA. Considering that the cost of MEA production accounts for about 75% of the production cost of the current solid polymer electrolyte fuel cells, reducing the amount of the electrode catalyst 5 by selective application makes tremendous contributions to reduction of the cost of fuel cells.

FIG. 1 displays a state in which the electrode catalyst 5 is applied only to the sites of the surfaces corresponding to the ion-conductive domains 3 with no electrode catalyst 5 given to the surface sites corresponding to the non-ion-conductive domains 4. Depending on the phase separation conditions between the ion-conductive domains 3 and the non-ion-conductive domains 4 in the electrode membrane 2 and the deposition conditions (hereinafter described) of the electrode catalyst 5, the electrode catalyst may also be applied to the surface sites corresponding to the non-ion-conductive domains 4. Even in such cases, the electrode catalyst 5 is applied in a larger amount to the surface sites corresponding to the ion-conductive domains 3 than to the surface sites corresponding to the non-ion-conductive domains 4.

Materials making up the electrolyte membrane 2 are typically exemplified by perfluorocarbonsulfonic acid resins, which are proton-conductive polymers. Perfluorocarbonsulfonic acid resins are preferred for their excellent chemical and thermal stability. Examples of this kind of resins include Nafion (a registered trademark of E.I. de Pont de Nemours & Co, U.S.A.), Aciplex (a registered trademark of Asahi Chemical Industry C.o., Ltd.), and Flemion (a registered trademark of Asahi Glass Co., Ltd.). Other useful polymers include sulfonated polyether ketone resins, sulfonated polyether sulfone resins, sulfonated polyphenylene sulfide resins, sulfonated polyimide resins, sulfonated polyamide resins, sulfonated epoxy resins, and sulfonated polyolefin resins.

The electric field-oriented, solid polymer ion conductor the present inventors proposed in JP-A-2003-234015 supra is also useful as a material constituting the electrolyte membrane 2. The electric field-oriented solid polymer ion conductor is obtained by orienting a polymer having an ionically dissociable group in an electric field. Such a polymer includes one prepared by polymerizing a monomer having a protonic acid group, such as a carboxyl group, a sulfonic acid group or a phosphoric acid group. Examples of the monomer are acrylic acid, methacrylic acid, vinylsulfonic acid, styrenesulfonic acid, and maleic acid. The electric field-oriented solid polymer ion conductor may contain a polymer having no ionic group. Examples of the polymer having no ionic group include fluoroalkyl polymers such as polyvinylidene fluoride, polytetrafluoroethylene, vinylidene fluoride-trifluoroethylene copolymers, vinylidene fluoride-hexafluoropropylene copolymers, and polytetrafluoroethylene-ethylene copolymers; alkyl polymers such as polyethylene, polypropylene, chlorinated polyethylene, and polyethylene oxide; and polymers having a substituted or unsubstituted arylene group in the main chain thereof, such as polycarbonate, polyester, polyester carbonate, and polybenzimidazole. The electric field-oriented solid polymer ion conductor may contain, in addition to the polymer having an ionically dissociable group and the polymer with no ionic group, a compatibilizer which is compatible with both of these polymers. Useful compatibilizers include known surface active agents, polyvinyl acetal, polyvinyl butyral, and polyvinylpyrrolidone. Also included are polyethylene glycol methacrylate, polyethylene glycol dimethacrylate, and polymers or oligomers obtained by copolymerizing the monomer providing these homopolymers and a copolymerizable monomer having, if desired, a hydroxyl group, an ester group, an amido group, a carbamoyl group, a sulfamoyl group, etc.

The electric field-oriented solid polymer ion conductor is obtained by dissolving or dispersing the polymer having an ionically dissociable group, the polymer having no ionic group that is used if desired, and the compatibilizer compatible with both the polymers that is used if desired in a solvent and subjecting the solution or dispersion to the step of electric field orientation by means for electric field orientation while the solvent is being removed.

What is called "a pore-filling polymer", i.e., a non-ion-conductive porous polymer the pores of which are filled with an ion-conductive polymer can also be used as a material of the electrolyte membrane 2. The non-ion-conductive porous polymer includes porous polytetrafluoroethylene and polyimide nonwoven fabric made mainly of crystalline polyimide fiber disclosed in JP-A-2004-185973. The ion-conductive polymer filling the pores of the non-ion-conductive porous polymer includes acrylic acid-sodium vinylsulfonate copolymers, perfluorocarbonsulfonic acid resins, polystyrenesulfonic acid resins, sulfonated polyether ether ketone resins, sulfonated polyphenylene sulfide resins, polyimide resins having a sulfonic acid group, and phosphoric acid-doped polybenzimidazole resins.

Filling the pores of a non-ion-conductive porous polymer with an ion-conductive polymer can be achieved by, for example, penetrating a solution of a monomer providing the ion-conductive polymer into the pores of the non-ion-conductive porous polymer and causing the monomer to polymerize to form the ion-conductive polymer in the pores. In another method, a solution of an ion-conductive polymer is infiltrated into a non-ion-conductive polymer, followed by solvent removal to fill the pores with the ion-conductive polymer.

Whatever kind of the electrolyte membrane 2 may be selected, the thickness of the membrane is not critical in the invention and may be decided as appropriate for the balance between strength and resistance of the membrane. Usually, a thickness of about 10 to 200 μm, preferably about 30 to 100 μm will be enough. When the electrolyte membrane 2 is formed by solution casting, the membrane thickness can be controlled by the solution concentration or the coating thickness on a substrate. Where the electrolyte membrane 2 is formed of a molten polymer, the thickness can be controlled by stretching a film of predetermined thickness formed by melt-pressing, melt-extrusion, etc. to a predetermined stretch ratio.

Any electrode catalysts that have hitherto been used in the art can be used as the electrode catalyst 5 with no particular restriction. Examples include platinum, gold, silver, palladium, iridium, rhodium, ruthenium, iron, cobalt, nickel, chromium, tungsten, manganese, vanadium, and alloys thereof. Among them, platinum is used predominantly. The metal particles as a catalyst usually have a particle size of 10 to 300 Angstroms. The catalyst can be adsorbed on a carrier such as carbon particles, which results in reduction of the amount of the catalyst to be used, offering an economical advantage. In view of the cost performance, a preferred amount of the catalyst to be used is about 0.001 to 10 mg/cm$^2$.

While not shown in FIG. 1, the MEA 1 of the present embodiment has, in addition to the electrode catalyst 5, a gas diffusion layer provided on both surfaces of the electrolyte membrane 2 to form an oxygen electrode and a fuel electrode. The gas diffusion layer functions as a supporting current collector having current collecting capabilities. The gas diffusion layer also serves to supply sufficient gas to the electrode catalyst 5. Useful gas diffusion layers include carbon paper and carbon cloth. More specifically, the gas diffusion layer can be formed of carbon cloth woven of a 1:1 mixture of polytetrafluoroethylene-coated carbon fiber and non-coated carbon fiber. The gas diffusion layer is prevented from being completely covered with water and thereby exhibits satisfactory gas permeability, since the carbon fiber is water repellent due to the polytetrafluoroethylene coating.

A separator is disposed on both sides of the MEA 1 of the present embodiment to provide a solid polymer electrolyte fuel cell. The separator has ribs extending in one direction at a prescribed spacing on its side facing the gas diffusion layer. Every adjacent ribs form therebetween a groove having a rectangular section. The grooves serve as flow channels for feeding and discharging a fuel gas or an oxidizing gas (e.g., air). The fuel gas and the oxidizing gas are fed from fuel gas feeding means and oxidizing gas feeding means, both not shown in the FIG. 1. The separators on both sides of the MEA 1 are disposed with their grooves crossing at right angles. The above-described configuration constitutes the minimum cell unit. Several tens to several hundreds of these cell units are stacked to make up a fuel cell stack.

Figure 3:
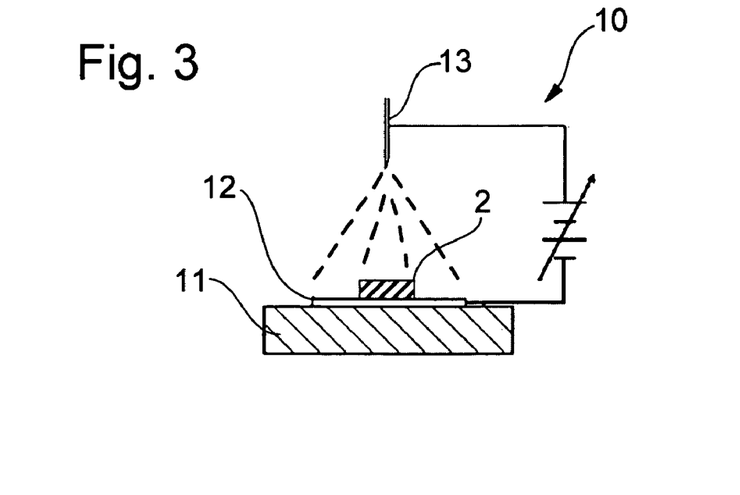
FIG. 3 schematically illustrates apparatus for carrying out an ESD method.

A preferred process of producing the MEA 1 of the present embodiment will then be described. One of the characteristics of the process resides in use of electrostatic spray deposition (hereinafter abbreviated as ESD) as a technique for applying the electrode catalyst 5 to the electrode membrane 2. FIG. 3 schematically illustrates an example of an ESD apparatus 10. A plate 12 made of an electron conductive material such as metal is placed on a flat mount 11. An electrolyte membrane 2 is put on the plate 12. Separately, a nozzle 13 ejecting a spray liquid is arranged above the electrolyte membrane 2 so as to face the electrolyte membrane 2. With an electric field applied between the metal plate 12 and the nozzle 13, a spray liquid is sprayed onto the electrolyte membrane 2 whereby an electrode catalyst is applied selectively on the surface sites corresponding to the ion-conductive domains 3 of the electrolyte membrane 2.

The spray liquid sprayed from the nozzle 13 is a dispersion containing the catalyst. Examples of a dispersing medium include aqueous media, such as a mixture of water and alcohol, and water. The spray liquid preferably contains an ion-conductive polymer to improve adhesion of the catalyst to the electrolyte membrane 2. While the polymer to be used is not particularly limited, to sue the same polymer as used to constitute the electrolyte membrane 2 is preferred to ensure adhesion of the catalyst.

The nozzle 13 preferably has a cross-sectional area of its openings of about 0.01 to 1 mm$^2$. The spray liquid is stored in a tank (not shown), delivered to the nozzle by feeding means such as a pump, and sprayed from the nozzle. The amount of the spray liquid to be sprayed is decided appropriately according to the catalyst concentration of the liquid and the amount of the catalyst to be applied to the electrolyte membrane 2. Usually, it is preferably about 1 to 1000 μl/min. For the same reasons, the time of spraying is preferably about 5 to 500 seconds.

The distance between the openings of the nozzle 13 and the electrolyte membrane 2 is preferably 5 to 200 mm, still preferably 10 to 100 mm, to assure uniformity of catalyst application and to prevent splash of the catalyst on an area other than the electrolyte membrane 2. The voltage applied between the nozzle 13 and the metal plate 12 is a direct current voltage. To make a proper spray and to spray the catalyst homogeneously, the voltage to be applied preferably ranges from 5 to 30 kV, still preferably 8 to 20 kV. While FIG. 3 shows voltage application with the nozzle 13 connected to a plus terminal and the metal plate 12 to a minus terminal, the polarities of the direct current voltage applied may be reversed.

It is preferred that the electrolyte membrane 2 be subjected to a hydrophilization treatment (a treatment for activating ion conductivity) prior to spraying the spray liquid. The hydrophilization treatment makes it possible to apply the electrode catalyst 5 with high selectivity to the ion-conductive domains. The hydrophilization treatment can be accomplished by immersing the electrolyte membrane 2 in ion exchange water or an aqueous solution of a mineral acid (e.g., sulfuric acid, hydrochloric acid or nitric acid) having a concentration of about 0.01 to 5 N for a prescribed time (e.g., about 1 to 100 minutes).

ESD can be carried out in the air at room temperature. After completion of spraying the spray liquid onto the electrolyte membrane 2, the medium of the spray liquid is allowed to evaporate in the same environment to give the electrolyte membrane 2. Thereafter, a gas diffusion layer is disposed on each side of the electrolyte membrane 2 to produce the MEA 1.

According to the above-described process, use of ESD makes it possible to deposit the catalyst selectively on the ion-conductive domains of the electrolyte membrane 2. ESD is generally known as a technique in which an electric field is applied between a nozzle ejecting a metal ion-containing solution and a metallic substrate to form a metal oxide thin film on the heated substrate. It is also known as a technique for forming various thin films including a carbon thin film. However, ESD has not been made use of as a technique for applying a functional material (a noble metal-based electrode catalyst in the process of the invention) selectively to conductive parts rather than to non-conductive parts of a substrate (i.e., an electrolyte membrane).

A second embodiment of the present invention is then described with reference to FIGS. 4(a) and 4(b). The description with respect to the first embodiment applies appropriately to the particulars of the second embodiment that are not described hereunder. The members of FIG. 4 that are the same as in FIG. 1 are given the same numerical references as in FIG. 1.

Figure 4A:
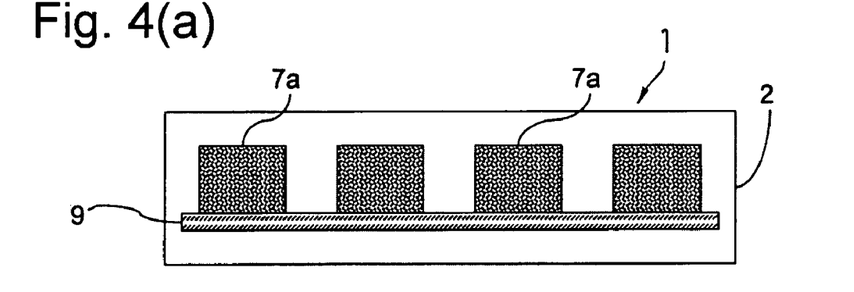
FIG. 4(a) and FIG. 4(b) are a plan and a longitudinal cross-section of a second embodiment of the MEA according to the present invention.
Figure 4B:
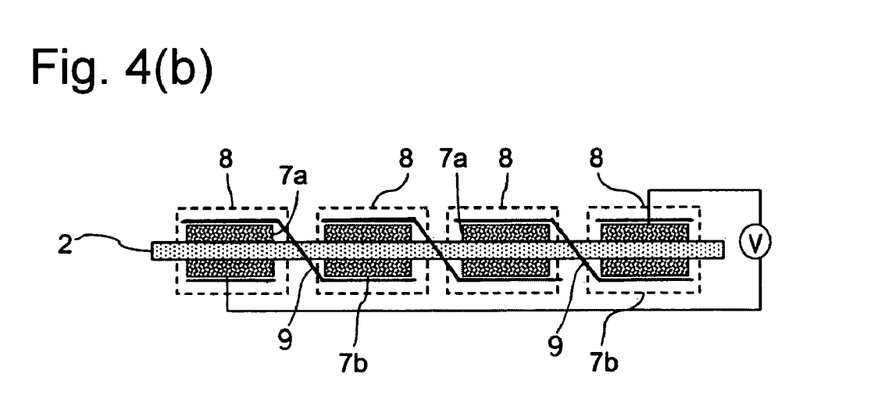

As illustrated in FIGS. 4(a) and 4(b), the MEA 1 of the present embodiment is of non-bipolar stacking type. The MEA 1 has a number of electrode catalyst adhesion regions 7a discretely provided on one surface of a solid polymer electrolyte membrane 2 and the same number of electrode catalyst adhesion regions 7b discretely provided on the other surface of the electrolyte member 2 at positions opposite to the electrode catalyst adhesion regions 7a across the electrolyte membrane 2. Depending on the method and the conditions of adhering the electrode catalyst, a small amount of the electrode catalyst can adhere to regions other than the adhesion regions 7a and 7b. Even in such cases, a much larger amount of the electrode catalyst is adhered in the adhesion regions 7a and 7b than in the other regions.

Each of pairs of the adhesion regions 7a and 7b facing each other across the electrolyte membrane 2 constitutes a single cell 8. The MEA 1 has a number of such single cells 8 connected in series via an interconnector 9. The adhesion regions 7a and 7b making up one pair facing across the electrolyte membrane 2 are of the same shape. The shape, while rectangular in the present embodiment, is not particularly limited. The area of the individual adhesion regions 7a and 7b is not particularly limited, either. Considering that non-bipolar stacking is suited to micro fuel cells, the area of the individual adhesion regions 7a and 7b is preferably 0.1 to 500 cm$^2$, still preferably 0.5 to 100 cm$^2$.

Since bipolar separators are not used in a non-bipolar stack configuration adopted in the present embodiment, the MEA 1 of the present embodiment achieves size and weight reduction and increased energy density of fuel cells more easily than the MEA having a bipolar plate stacking configuration.

FIG. 1 corresponds to an enlarged view of the individual adhesion regions 7a and 7b formed on both surfaces of the electrolyte membrane 2. That is, each adhesion region 7a or 7b has both the surface sites corresponding to the ion-conductive domains 3 (see FIG. 1) and the surface sites corresponding to the non-ion-conductive domains 4 (see FIG. 1). Each adhesion region 7a or 7b has the electrode catalyst adhered selectively on the surface sites corresponding to the ion-conductive domains rather than on the surface sites corresponding to non-ion-conductive domains. Accordingly, when viewed macroscopically, the electrolyte membrane 2 of the MEA 1 of the present embodiment has electrode catalyst adhesion regions 7a and 7b and regions with no electrode catalyst adhered. When viewed microscopically, each of the adhesion regions 7a and 7b also has sites with the electrode catalyst adhered (the surface sites corresponding to the ion-conductive domains) and sites free of the electrode catalyst (the surface sites corresponding to the non-ion-conductive domains). Thus, the MEA 1 of the present embodiment has the electrode catalyst adhered with extremely high selectivity. Therefore, the present embodiment makes it feasible to reduce the amount of the expensive catalyst including a noble metal without being accompanied by impairment of the performance of the MEA 1.

In a conventional MEA of non-bipolar stack configuration, occurrence of crossover between adjacent single cells has been prevented by disposing a non-ion-conductive material, such as engineering plastics, between the single cells, i.e., between adhesion regions 7a (or 7b) neighboring on the sample plane. However, such an MEA has a complicated structure and requires labor and cost for the production. According to the present embodiment, in contrast, a large number of single cells can be fabricated on a single electrolyte membrane 2, which offers the advantage that the MEA structure is not complicated. Furthermore, use of the process of production hereinafter described facilitates selective formation of the adhesion regions 7a and 7b. To prevent crossover from occurring and to achieve battery downsizing, the distance between neighboring adhesion regions 7a (or 7b) on the same plane is preferably about 1 to 20 mm, still preferably about 2 to 10 mm. Understandably, an insulator such as an engineering plastic and ceramics may be applied between adjacent single cells on one or both surfaces of the electrolyte membrane 2, which will be effective to ensure insulation against electron and ion conduction.

A preferred process of producing the MEA 1 of the embodiment shown in FIGS. 4(a) and 4(b) will be described below. First of all, a solid polymer electrolyte membrane is prepared. A solid polymer electrolyte membrane is generally available in a dry state which has not been given a treatment for rendering ion-conductive. An electrolyte membrane in that state is substantially free from dissociated protons. The expression "substantially free from dissociated protons" as used herein does not mean that there are no dissociated protons but that existence of a trace amount of dissociated protons resulting from adsorption of moisture in the air is acceptable. An ion-conductive liquid is discontinuously applied to one surface of the electrolyte membrane of that state. For example, a microsyringe is used to apply an ion-conductive liquid discretely on one surface of the electrolyte membrane. When the liquid is applied in a rectangular pattern, a rectangular adhesion region will be formed by ESD as hereinafter described. The electrolyte membrane may be dried in vacuo to ensure substantial freedom from dissociated protons.

The ion-conductive liquid includes water, a dilute aqueous acid solution, and a lower alcohol. The dilute aqueous acid solution includes an about 0.01 to 5N aqueous solution of a mineral acid such as sulfuric acid, hydrochloric acid or nitric acid. The lower alcohol includes C1 to C4 alcohols, particularly methanol and ethanol.

The present inventor's study has revealed that addition of a small amount of the ion-conductive liquid to the electrolyte membrane is sufficient. An electrode catalyst adhesion region can be formed on the surface of the electrolyte membrane by applying the ion-conductive liquid in an amount as small as about 1 to 300 μl, preferably about 20 to 100 μl, per square centimeter, which varies depending on the kind of the electrolyte membrane.

The electrolyte membrane having the ion-conductive liquid applied thereto is then subjected to the aforementioned ESD process. In carrying out ESD, the electrolyte membrane is placed with its surface having been given the ion-conductive liquid facing with the nozzle. ESD is carried out under the conditions previously stated.

An electrode catalyst is deposited selectively by the ESD process on the regions where the ion-conductive liquid has been applied, whereby many discrete adhesion regions are formed on one surface of the electrolyte membrane, and the sites where the electrode catalyst is applied are given ion conductivity. The reason accounting for the selective application of the electrode catalyst has not been made clear as yet. According to the inventors' assumption, an electric field applied to the ion-conductive liquid in ESD causes the ion-conductive liquid to instantaneously penetrate into the electrolyte membrane to impart ion conductivity to the impregnated portion, which may account for the selection adhesion of the electrode catalyst.

Microscopic observation of the region where the electrode catalyst has been deposited, i.e., the adhesion region proves that the electrode catalyst has been applied selectively onto the surface sites corresponding to the ion-conductive domains in the region rather than onto the surface sites corresponding to the non-ion-conductive domains, which is similar to the case with the embodiment shown in FIG. 1.

The time from application of the ion-conductive liquid to the electrolyte membrane to ESD is not critical. What is noteworthy is that selective application of an electrode catalyst can be accomplished to impart ion conductivity to the electrode catalyst adhesion region even though the above-mentioned time is extremely as short as several minutes. In order to make an electrolyte membrane ion-conductive, it has been said to be necessary that the electrolyte membrane should be immersed in, e.g., an aqueous acid solution at room temperature or while boiling for several hours to about 24 hours. In contrast, the above-described process enables an electrolyte membrane to be made ion-conductive selectively in an extremely short time.

By the above-described operation, a number of adhesion regions are discretely formed on one surface of the electrolyte membrane. Subsequently, the electrolyte membrane is reversed, and ESD is carried out on the other surface. It is not necessary to apply the ion-conductive liquid to the other surface of the electrolyte membrane because the electrolyte membrane has already been rendered ion-conductive by the first ESD.

The electrode catalyst is thus applied to the other surface of the electrolyte membrane by the second ESD. The regions to which the electrode catalyst is applied are where the electrolyte membrane has been made ion-conductive. In other words, the electrode catalyst is applied in the second ESD to the regions opposite to the regions where the electrode catalyst has been applied in the first ESD across the electrolyte membrane. Thus, the process of the present embodiment enables application of the electrode catalyst, i.e., formation of adhesion regions, on the same positions as the regions opposite across the electrolyte membrane without requiring a special operation for positioning.

EXAMPLES

The present invention will now be illustrated in greater detail with reference to Examples, but it should be understood that the invention is not construed as being limited thereto. Unless otherwise noted, all the percents are given by weight.

Example 1

(1) Preparation of Catalyst Dispersion

Platinum-on-carbon (20% Pt) was finely ground with water in an agate mortar and mixed with a mixed alcohol solution (methanol:2-propanol:water=1:1:1 by weight). A 5% solution of a perfluorocarbonsulfonic acid resin (Nafion, a registered trademark of Du Pont) was added thereto to prepare a catalyst dispersion. The resulting catalyst dispersion had a platinum-on-carbon to perfluorocarbonsulfonic acid resin weight ratio of 1:1. The solids concentration was adjusted to 1.7%.

(2) Preparation of Electrolyte Membrane

Polyacrylic acid, polyvinyl butyral, and a fluororesin (Cefral Soft, available from Central Glass Co., Ltd.) at a weight ratio of 3:1:6 were dissolved in 15 parts of dimethylformamide under heating. The resulting solution was applied to a glass substrate. An external electric field of 8000 V/cm was applied to the coating layer with means for electric field orientation until the solution dried to the touch to form a thin film. The glass substrate with a polymer thin film formed thereon was dried by heating at 150° C. for 1 hour in a vacuum dryer. After cooling, the polymer thin film was stripped off the glass substrate to obtain an electrolyte membrane having a thickness of 40 µm. The electrolyte membrane was immersed in a 1N sulfuric acid aqueous solution for 5 minutes and washed thoroughly with ion exchanged water to complete a hydrophilization treatment (ion conductivity activation treatment).

(3) ESD

ESD was performed using the apparatus 10 shown in FIG. 3. A metal plate 12 which was a gold electrode was placed on the mount 11. The electrolyte membrane 2 prepared in (2) above was put on the metal plate 12. The distance between the nozzle 13 and the electrolyte membrane 2 was set at 40 mm. With an electric field of 12 kV applied between the nozzle 13 and the metal plate 12, the spray liquid was sprayed from the nozzle 13 onto the electrolyte membrane 2 at room temperature in the air. The nozzle 13 was connected to a positive pole, and the metal plate 12 a negative pole. The spray liquid was fed at a rate of 33.33 µl/min and sprayed for 15 seconds. After ESD, the sprayed liquid was dried at room temperature in the air. The electrolyte membrane was reversed, and ESD was conducted on the other surface in the same manner. The sprayed liquid was dried at room temperature in the air, whereby an electrolyte membrane having an electrode catalyst deposited on each surface thereof was obtained. The amount of the applied electrode catalyst at each surface was 0.03 mg/cm$^2$. Carbon cloth was overlaid on each surface of the electrolyte membrane as a gas diffusion layer to give an MEA.

Comparative Example 1

The catalyst dispersion of Example 1 was directly dropped on each surface of the electrolyte membrane of Example 1 before being subjected to the hydrophilization treatment. The excess dispersion was struck off the surface of the electrolyte membrane using a polyethylene terephthalate film. An MEA was prepared in otherwise the same manner as in Example 1. The amount of the supported electrode catalyst was 1.52 mg/cm$^2$.

Performance Evaluation:

The MEAs obtained in Example 1 and Comparative Example 1 were evaluated by observing the surface of the electrolyte membrane with a scanning electron microscope before the gas diffusion layer was disposed. The results are shown in FIG. 5 (Example 1) and FIG. 6 (Comparative Example 1).

Figure 5:
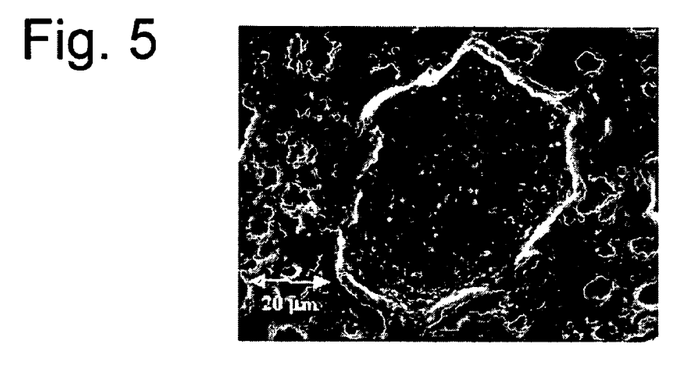
FIG. 5 is a scanning electron micrograph image taken of a surface of the electrolyte membrane of the MEA prepared in Example 1.

The electron micrograph image of FIG. 5 reveals many fine white spots on the periphery of ion-conductive domains, which are believed to be caused by adhesion of much catalyst. It is seen that the catalyst adheres selectively on the ion-conductive domains, avoiding the non-ion-conductive domains. Mapping of the microscopic field by EDS ascertained selective existence of platinum and sulfur on the surface sites corresponding to the ion-conductive domains. The platinum and the sulfur originate in the catalyst and the perfluorocarbonsulfonic acid resin contained in the spray liquid, respectively. Accordingly, the results of the mapping prove that the spray liquid adhered selectively to the surface sites corresponding to the ion-conductive domains.

Figure 6:
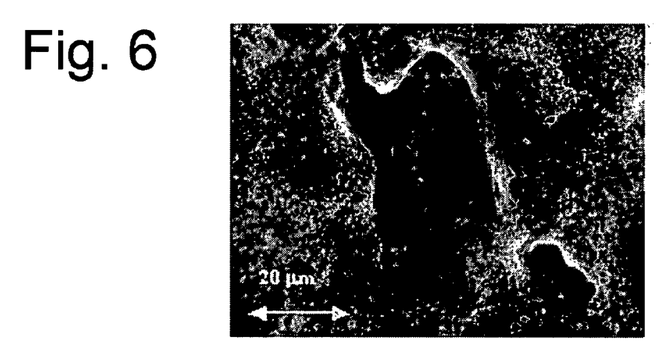
FIG. 6 is a scanning electron micrograph image taken of a surface of the electrolyte membrane of the MEA prepared in Comparative Example 1.

In contrast, FIG. 6 reveals adhesion of much particulate catalyst to the non-ion-conductive domains as well. It was confirmed as a result of mapping that platinum and sulfur were distributed almost uniformly over the entire microscopic field of view. The results of mapping indicate that application of the spray liquid was not selective between the ion-conductive and the non-ion-conductive domains.

Example 2

The same electrolyte membrane as prepared in Example 1 was used, except that the hydrophilization treatment (ion conductivity activation treatment) was not conducted. The electrolyte membrane was substantially free from dissociated protons. Ion exchanged water was dropped using a microsyringe on one surface of the electrolyte membrane in a discontinuous manner in an amount of 80 µl/cm$^2$. Before the ion exchange water evaporated, ESD was carried out on the electrolyte membrane using the same spray liquid and ESD conditions as in Example 1, except for changing the spray liquid feed rate to 10 µl/min and the spray time to 30 seconds. An MEA was prepared in otherwise the same manner as in Example 1. The MEA had the catalyst electrode adhered selectively to the sites where ion exchanged water had been dropped to form electrode catalyst adhesion regions. The MEA had the same shape of adhesion regions on the opposite sites across the electrolyte membrane.

Example 3

Nafion (a registered trademark of Du Pont) 117 was used as an electrolyte membrane. The electrolyte membrane was vacuum dried overnight to become substantially free from dissociated protons. Ion exchanged water was dropped using a microsyringe on one surface of the electrolyte membrane in a discontinuous manner in an amount of 30 µl/cm$^2$. An MEA was prepared in the same manner as in Example 2, except for changing the spray liquid feed rate to 20 µl/min (the spray time was 30 seconds). The resulting MEA had the catalyst electrode adhered selectively to the sites where ion exchanged water had been dropped to form electrode catalyst adhesion regions. The MEA had the same shape of adhesion regions on the opposite sites across the electrolyte membrane.

Example 4 and Comparative Example 2

Nafion (a registered trademark of Du Pont) 117 was used as an electrolyte membrane. A 25 mm side square was cut out of the electrolyte membrane and was made electrically conductive by boiling in an 1N sulfuric acid aqueous solution and then in pure water each for one hour in a usual manner. A 10 mm side square of gold foil having conducting wire connected to the back side thereof was bought into intimate contact with the central portion of one surface of the electrolyte membrane. The electrolyte membrane was placed on an insulating polyethylene terephthalate film having a pinhole, with the metal foil facing the film and with the conducting wire run through the pinhole and kept from being exposed. The conducting wire was connected to the negative pole of the power source shown in FIG. 3. In this state, ESD was carried out in the same manner as in Example 3. As result, an electrode catalyst was deposited only on the area of the electrolyte membrane that corresponded to the gold foil (Example 4). The amount of the electrode catalyst deposited was 1 mg/cm$^2$.

For comparison, the electrode catalyst was deposited only to the area of the electrolyte membrane that corresponded to the gold foil by using a compressed air sprayer (Spray-Work, available from Tamiya Inc.) in place of ESD. The amount of the electrode catalyst adhered was the same as in Example 4.

Figure 7:
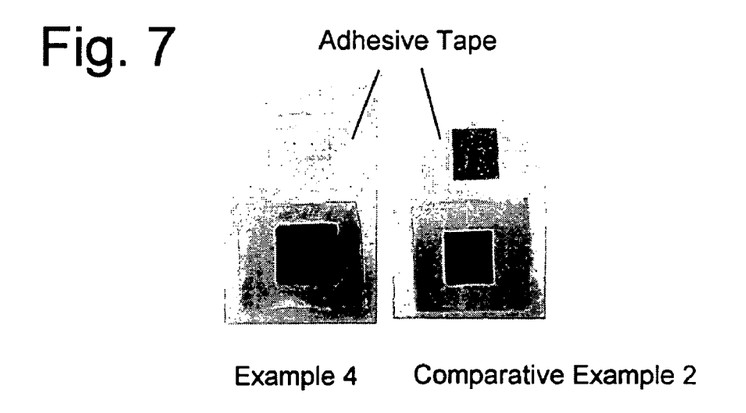
FIG. 7 is a photograph presenting the appearance and the results of a peel test of the samples obtained in Example 4 and Comparative Example 2.

The two samples obtained were tested for peel strength of the electrode catalyst as follows. The samples were dried at 140° C. for 30 minutes. Adhesive tape (from Sumitomo 3M Ltd.) was stuck to the electrode catalyst adhesion region of each sample and stripped off. The area of the electrode catalyst transferred to the adhesive tape was observed with the naked eye. The results are shown in FIG. 7. As is apparent from the results of FIG. 7, the sample of Example 4 suffered from less peeling of the electrode catalyst than that of Comparative Example 2. This means that the electrode catalyst applied by electrostatic spray deposition forms a catalyst layer with high adhesion to the electrolyte membrane and hardly comes off.

Example 5 and Comparative Example 3

Nafion (a registered trademark of Du Pont) 112 was used as an electrolyte membrane. A 4 cm side square was cut out of the electrolyte membrane. An electrode catalyst was deposited on the central portion measuring 2.2 cm by 2.2 cm on each surface of the electrolyte membrane in the same manner as in Example 4 (Example 5). The amount of the electrode catalyst deposited was 1 mg/cm$^2$. For comparison, the electrode catalyst was adhered to the above-described electrolyte membrane in the same manner as in Comparative Example 2 (Comparative Example 3). The amount of the electrode catalyst adhered was the same as in Example 5.

Each of the resulting two samples was dried at 140° C. for 30 minutes. Carbon cloth (from Electrochem Inc.) having been made water-repellent was overlaid as a gas diffusion layer on each surface of the sample to make an MEA. The MEA was assembled into a single cell (PEFC SS-J from Chemix Co., Ltd.). Humidified pure oxygen and pure hydrogen were fed to the positive electrode and the negative electrode, respectively, each at a rate of 10 ml/min, and power generation characteristics of the fuel cell at 60° C. were measured. As a result, the sample of Example 5 showed an open circuit voltage of 0.93 V and a maximum power output of 120 mW/cm$^2$. The sample of Comparative Example 3 had an open circuit voltage of 0.92 V, but its maximum power output was only 80 mW/cm$^2$. It is seen from these results that the selective deposition of the electrode catalyst to the electrolyte membrane by electrostatic spray deposition promises superior power generation performance.

Example 6

Figure 8:
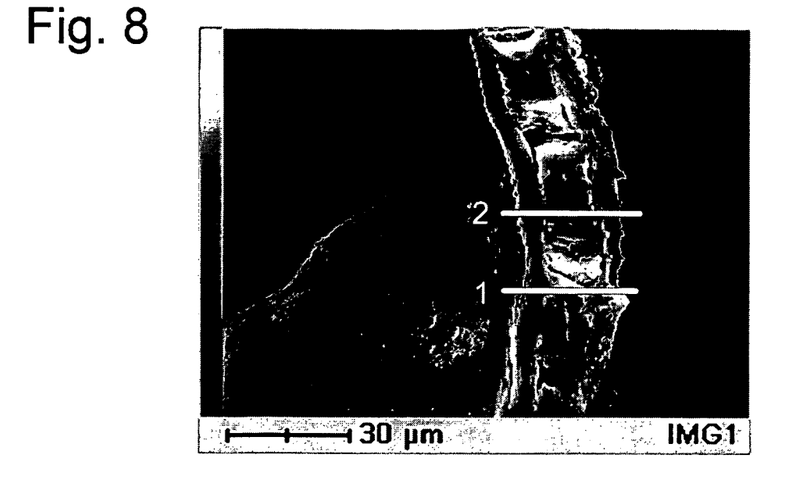
FIG. 8 is a scanning electron micrograph image of a cross-section of the sample obtained in Example 6.
Figure 9:
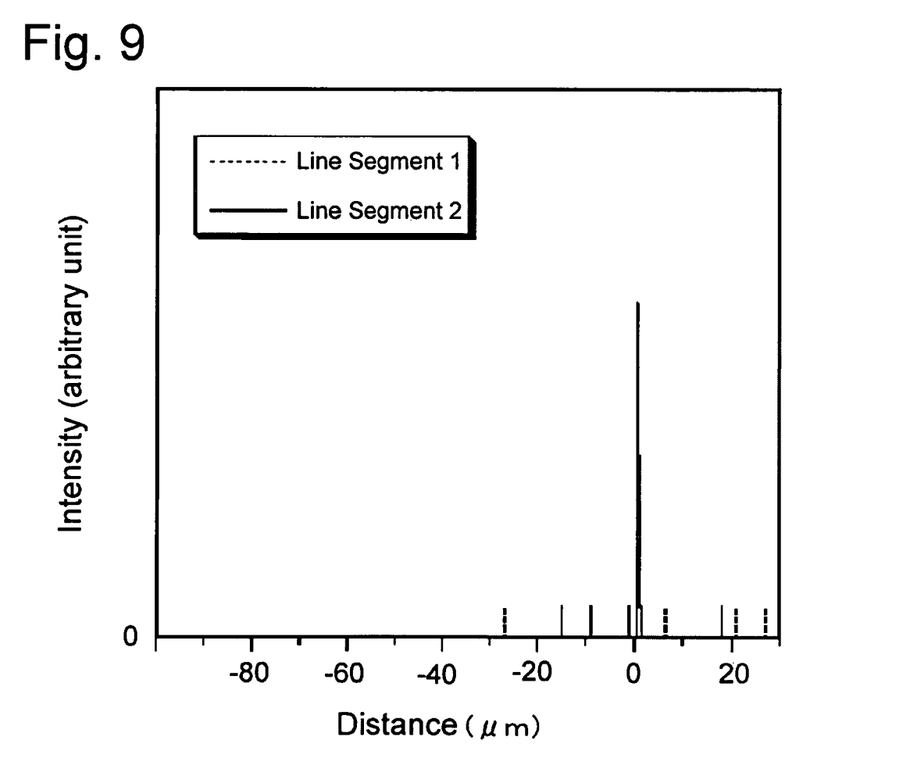
FIG. 9 is a chart showing the results of elemental analysis on platinum on the cross-section of the sample obtained in Example 6.

A polycarbonate porous film having a thickness of about 13 µm, an average pore size of 5 µm, and a porosity of 15% (Nuclepore from Whatman) having its pores filled with Nafion® was prepared. Specifically, the porous membrane was immersed in a 20 wt % Nafion solution and irradiated with ultrasonic waves to fill the pores with the Nafion solution. The porous film was taken out of the Nafion solution, slowly dried in the presence of alcohol vapor, and finally dried in vacuo at 140° C. for 30 minutes to obtain a pore-filling electrolyte membrane having its pores filled with Nafion. An electrode catalyst was deposited on one surface of the electrolyte membrane in the same manner as in Example 1. FIG. 8 presents a scanning electron micrograph taken of a cross-section of the resulting sample. Line segment 1 indicates where a vacant pore had been and was filled with Nafion, and line segment 2 indicates the polycarbonate matrix. The sites indicated by line segments 1 and 2 were analyzed for platinum in the thickness direction. The results are shown in FIG. 9. In FIG. 9, the distance coordinate agrees with that in FIG. 8, and distance 0 μm indicates the position of the surface on the right hand side in FIG. 8. As is apparent from the results in FIG. 9, in the site of line segment 1 platinum is present only at the position of 0 μm distance, i.e., on the right hand side surface in FIG. 8. Platinum is absent in the site of line segment 2. It is understood from these results that the electrode catalyst had been deposited only on the desired sites.

Example 7 and Comparative Example 4

An electrode catalyst was deposited on the pore-filling electrolyte membrane prepared in Example 6 in the same manner as in Example 5 to obtain an MEA (Example 7). For comparison, an electrode catalyst was deposited in the same manner as in Comparative Example 3 to obtain an MEA (Comparative Example 4). The resulting membrane-electrode assemblies were evaluated for power generation characteristics in the same manner as in Example 5. The sample of Example 7 showed an open circuit voltage of 0.92 V and a maximum power output of 60 mW/cm$^2$ whereas the sample of Comparative Example 4 had an open circuit voltage of 0.92 V and a maximum power output of 40 mW/cm$^2$. It is seen from these results that the selective deposition of the electrode catalyst to the electrolyte membrane by electrostatic spray deposition promises superior power generation performance.

INDUSTRIAL APPLICABILITY

As described, the present invention makes it possible to reduce the amount of an expensive catalyst including a noble metal required in the preparation of a membrane-electrode assembly without impairing the performance of the assembly, thereby making great contributions to reduction of the cost of solid polymer electrolyte fuel cells.

The invention claimed is:

1. A membrane-electrode assembly comprising
   a solid polymer electrolyte membrane which has ion-conductive domains and non-ion-conductive domains and an electrode catalyst,
   wherein the electrode catalyst is present selectively on surface sites of the solid polymer electrolyte membrane which corresponds to the ion-conductive domains rather than surface sites of the electrolyte membrane which corresponds to the non-ion-conductive domains, and
   the ion-conductive domains and the non-ion-conductive domains extend in a width direction of the solid polymer electrolyte membrane.

2. The membrane-electrode assembly according to claim 1, wherein the selective presence of the electrode catalyst on the surface sites which corresponds to the ion-conductive domains is obtainable by spraying a spray liquid which contains the electrode catalyst and a solvent onto the surface of the solid polymer electrolyte membrane by electrostatic spray deposition.

3. The membrane-electrode assembly according to claim 1, wherein the solid polymer electrolyte membrane has a first surface and a second surface which is opposite to the first surface,
   the solid polymer electrolyte membrane has a number of first electrode catalyst adhesion regions discretely formed on the first surface thereof, and a number of second electrode catalyst adhesion regions discretely formed on the second surface thereof,
   the first electrode catalyst adhesion regions are positioned opposite to the second electrode catalyst adhesion regions,
   each of the first and the second electrode catalyst adhesion regions includes the surface sites which corresponds to the ion-conductive domains and the surface sites which corresponds to the non-ion-conductive domains, and has the electrode catalyst which is selectively present on the surface sites which corresponds to the ion-conductive domains rather than the surface sites which corresponds to the non-ion-conductive domains.

4. The membrane-electrode assembly according to claim 3, wherein the solid polymer electrolyte membrane and a pair of the electrode catalyst adhesion regions opposite each other across the electrolyte membrane constitute a single cell, and the single cells are connected in series via an interconnector.

5. The membrane-electrode assembly according to claim 1, wherein the solid polymer electrolyte membrane comprises a perfluorocarbonsulfonic acid resin, an electric field-oriented solid polymer ion conductor obtainable by orienting a polymer having an ionically dissociable group in an electric field, or a pore-filling polymer obtainable by filling pores of non-ion-conductive porous polymer with an ion-conductive polymer.

6. A process of producing the membrane-electrode assembly according to claim 1, comprising
   applying a spray liquid containing the electrode catalyst and a solvent onto a surface of the solid polymer electrolyte membrane by electrostatic spray deposition.

7. The process according to claim 6, wherein, under the condition in which the solid polymer electrolyte membrane is placed on an electron conductive plate, and a nozzle ejecting the spray liquid is arranged to face the solid polymer electrolyte membrane, the spray liquid is sprayed from the nozzle onto the solid polymer electrolyte membrane with an electric field applied between the electron conductive plate and the nozzle.

8. The process according to claim 7, wherein the solid polymer membrane is subjected to a hydrophilization treatment before being sprayed with the spray liquid.

9. A process of producing a membrane-electrode assembly comprising the steps of:
   discretely applying an ion-conductive liquid to a surface of a solid polymer electrolyte membrane which is substantially free from a dissociated proton, and then
   applying a spray liquid containing an electrode catalyst and a solvent onto the surface of the solid polymer electrolyte membrane by electrostatic spray deposition to adhere the electrode catalyst selectively to the part of the solid polymer electrolyte membrane where the ion-conductive liquid has been applied,
   wherein ion-conductive domains and non-ion-conductive domains extend in a width direction of the solid polymer electrolyte membrane.

10. The process according to claim 9, wherein the ion-conductive liquid is water, a dilute acid aqueous solution, or a lower alcohol.

11. A solid polymer electrolyte fuel cell comprising the membrane-electrode assembly according to claim 1, and a separator which is arranged on each side of the membrane-electrode assembly.

12. The membrane-electrode assembly according to claim 1, wherein the catalyst contains metal particles having a particle size of 10 to 300 μm.

13. The membrane-electrode assembly according to claim 1, wherein the catalyst has a coverage of 0.001 to 10 mg/cm$^2$.

14. The process according to claim 9, wherein the catalyst contains metal particles having a particle size of 10 to 300 μm.

15. The process according to claim 9, wherein the catalyst is applied to have a coverage of 0.001 to 10 mg/cm$^2$.

16. The process according to claim 6, wherein the electrostatic spray deposition is performed at a voltage of 5 to 30 kV.

17. The process according to claim 9, wherein the electrostatic spray deposition is performed at a voltage of 5 to 30 kV.

* * * * *